US010121505B1

(12) United States Patent
Kashiwagi

(10) Patent No.: US 10,121,505 B1
(45) Date of Patent: Nov. 6, 2018

(54) HARD DISK DEVICE AND METHOD OF CONTROLLING THE SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Kazuto Kashiwagi, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 15/909,536

(22) Filed: Mar. 1, 2018

(30) Foreign Application Priority Data

Sep. 15, 2017 (JP) .................................. 2017-178357

(51) Int. Cl.
*G11B 21/02* (2006.01)
*G11B 5/596* (2006.01)
*G11B 20/12* (2006.01)

(52) U.S. Cl.
CPC ...... *G11B 5/59627* (2013.01); *G11B 20/1217* (2013.01); *G11B 2020/1238* (2013.01); *G11B 2020/1292* (2013.01)

(58) Field of Classification Search
CPC ........... G11B 5/012; G11B 27/36; G11B 5/02; G11B 2220/20; G11B 5/00; G11B 15/14; G11B 5/0086; G11B 15/125; G11B 5/6005; G11B 5/59633; G11B 5/54

USPC ....................... 360/25, 78.04, 31, 55, 64, 75
See application file for complete search history.

(56) References Cited

U.S. PATENT DOCUMENTS

| 6,639,746 | B1 | 10/2003 | Chung et al. |
| 6,646,825 | B1 | 11/2003 | Kaneda et al. |
| 7,626,908 | B2* | 12/2009 | Nakagawa ......... G11B 20/1258 360/78.04 |
| 8,570,681 | B2 | 10/2013 | Ho |
| 8,867,161 | B2 | 10/2014 | Emo et al. |
| 8,885,284 | B2 | 11/2014 | Kashiwagi et al. |

* cited by examiner

*Primary Examiner* — Nabil Hindi
(74) *Attorney, Agent, or Firm* — Patterson & Sheridan, LLP

(57) ABSTRACT

A hard disk device comprises a scanning mechanism that simultaneously scans a first recording medium surface with a first recording head and a second recording medium surface with a second recording head, a table storing band relative position information for a first band on the first recording medium surface and a second band on the second recording medium surface, and a processor. The processor calculates an inter-plane relative trajectory error between the first and second recording heads, determines a data access order performed by the first recording head on the first band and the second recording head on the second band, based on the band relative position information and the inter-plane relative trajectory error, and causes the first recording head to access a track and the second recording head to access a track in the data access order determined by the determining unit.

20 Claims, 7 Drawing Sheets

| DISK SURFACE | FRONT SURFACE | BACK SURFACE |
|---|---|---|
| STARTING | A1 | A2 |
| SIMULTANEOUS RECORDING | B1 | B2 |
| SUBSEQUENT | C1 | C2 |

# HARD DISK DEVICE AND METHOD OF CONTROLLING THE SAME

CROSS-REFERENCE TO RELATED APPLICATION

This application is based upon and claims the benefit of priority from Japanese Patent Application No. 2017-178357, filed Sep. 15, 2017, the entire contents of which are incorporated herein by reference.

FIELD

Embodiments described herein relate generally to a hard disk device and a method of controlling the same.

BACKGROUND

Development of technology for simultaneously recording (writing) and reading on a plurality of medium surfaces in a hard disk device is under way. Since this technology is able to increase the number of channels for recording and reading of data, it is useful for increasing a writing/reading transfer rate.

However, after media and recording (writing) heads are assembled into a hard disk device and a physical deviation of each recording head that accesses a medium surface is adjusted, additional relative recording head error between two medium surfaces may occur due to subsequent factors such as impact and thermal deformation. This additional relative recording head error between two medium surfaces is referred to herein as an "inter-plane relative trajectory error." When mechanical measures are taken to address the inter-plane relative trajectory error caused by such factors, such as individually adjusting the positions of the recording heads, the number of components in the hard disk device is increased, and the mechanical design of the hard disk device becomes significantly more complicated.

DETAILED DESCRIPTION

Figure 1:
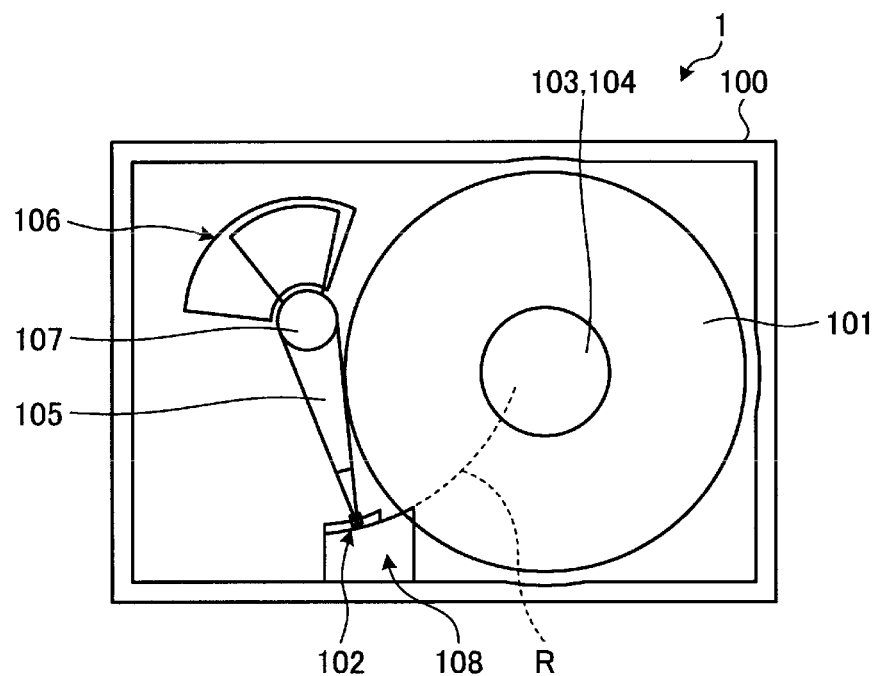
FIG. 1 is a view illustrating an example of the configuration of a hard disk device according to an embodiment.

Embodiments provide a hard disk device capable of absorbing an inter-plane relative trajectory error occurring between medium surfaces for each recording head without relying on any mechanical parts, and a method of controlling the same.

In general, according to one embodiment, a hard disk device includes a scanning mechanism that simultaneously scans a first recording medium surface with a first recording head and a second recording medium surface with a second recording head, a table storing band relative position information for a first band on the first recording medium surface and a second band on the second recording medium surface, and a processor. The processor calculates an inter-plane relative trajectory error between the first and second recording heads, determines a data access order performed by the first recording head on the first band and the second recording head on the second band, based on the band relative position information and the inter-plane relative trajectory error, and causes the first recording head to access a track and the second recording head to access a track in the data access order determined by the determining unit.

Hereinafter, a hard disk device according to an embodiment and a method of controlling the same will be described in detail with reference to the accompanying drawings. The present disclosure is not limited by this embodiment.

Embodiment

A hard disk device according to the present embodiment includes a scanning mechanism that simultaneously scans each of a plurality of recording medium surfaces with a respective recording head that corresponds to the medium surface. The plurality of medium surfaces are recording surfaces that are disposed on one or more recording disks. For example, in the case of a configuration having a single recording disk, the front surface and the back surface of the recording disk are each used as a recording surface. In the present embodiment, the hard disk device further includes a table for storing band relative position information for a plurality of recording medium surfaces, a calculating unit, a determining unit, and a control unit.

The calculating unit calculates an inter-plane relative trajectory error between each two corresponding recording heads with respect to a corresponding magnetic disk. As used herein, the term "inter-plane relative trajectory error" refers to a positional error caused by relative positional deviation between two corresponding recording heads with respect to corresponding medium surfaces. This error is caused by factors such as impact and thermal deformation. This error varies from small deviations to large deviations that are on the order of 1 μm. In the present embodiment, control of the hard disk device is described in the presence of an inter-plane relative trajectory error, as will be described in detail later.

The determining unit determines, for bands on corresponding recording medium surfaces, a data access order of the bands by corresponding recording heads, where the data access order is subsequently employed as the order in which data are written to and read from the bands. Scanning of the scanning mechanism of the hard disk device causes a first recording head to pass through a first band on a first recording medium surface while a second recording head simultaneously passes through a second band on a second recording medium surface that corresponds to the first recording medium surface. The data access order is based on band relative position information for the first and second band and on the inter-plane relative trajectory error between the first recording head and the second recording head.

The control unit controls data access in a band of each medium surface in the order of data access determined by the determining unit.

Regarding the hard disk device of the present embodiment and the method of controlling the same, descriptions will be made with respect to a hard disk device in which data are recorded on a magnetic disk by a magnetic head in a shingled magnetic recording (SMR) method. As used herein, the term "magnetic disk" corresponds to a "recording disk" and the term "magnetic head" corresponds to a "recording head".

FIG. 1 is a view illustrating an example of the configuration of a hard disk device according to an embodiment. FIG. 1 shows a configuration inside a housing in which the upper cover of the hard disk device is removed. As shown in FIG. 1, the hard disk device 1 includes a magnetic disk 101, a set of magnetic heads 102 that read and write data on the front surface and the back surface of the magnetic disk 101, and the like. As used herein, the terms "front surface" and "back surface" of the magnetic disk 101 are each an example of "medium surface". In the present embodiment, the number of magnetic disks is illustrated as one, but the number of magnetic disks may be two or more. In that case, the "medium surface" may apply to a plurality of magnetic disks.

The magnetic disk 101 is mounted on a rotary shaft 104 of a spindle motor (SPM) 103 and is rotated by driving of the rotary shaft 104.

Each magnetic head in the set of magnetic heads 102 is attached to the respective distal end portions of a pair of arms 105. The pair of arms 105 are driven together by a voice coil motor (VCM) 106 and are integrally rotated within a range determined in both the positive and negative directions around an axis 107. That is, the pair of arms 105 and the VCM 106 make up the "scanning mechanism," and are configured as one actuator. By the operation of this one actuator, the magnetic heads 102 are moved (i.e., scanned) together along a path indicated by broken line R. In the course of this movement, the magnetic heads 102 are sequentially positioned proximate the corresponding tracks on the front and back surfaces of the magnetic disk 101. The path indicated by broken line R is an arcuate path followed by the magnetic heads over the magnetic disk when the scanning mechanism rotates.

Each of the magnetic heads 102 has a read element and a write element. Data on a surface to be scanned on the magnetic disk 101 is read by the read element, and data is written on the same surface by the write element.

The hard disk device 1 further includes a ramp load mechanism 108 that retracts and parks the set of magnetic heads 102 from the magnetic disk 101.

A control system (see FIG. 3), which controls the various parts of the hard disk device 1, is disposed in the bottom portion of the hard disk device 1, and is not visible in FIG. 1. The control system communicates with a host 40 (see FIG. 3) via an interface, such as a connection pin provided in the housing 100 of the hard disk device 1 for external connection, and controls the respective parts of the hard disk device 1 in accordance with a command from the host 40 or the like.

Figure 2A:
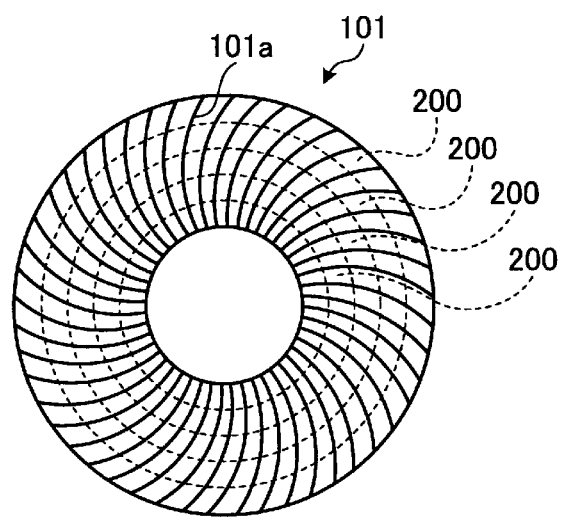
FIGS. 2A and 2B are explanatory views of the configuration of a magnetic disk according to an embodiment.
Figure 2B:
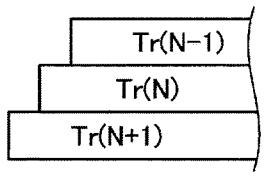

FIGS. 2A and 2B are detailed views of the configuration of the magnetic disk 101. The magnetic disk 101 has magnetic materials on both sides of a platter, on which servo information is written by a servo writer or the like before shipping. FIG. 2A shows servo zone 101a radially arranged on one side of the magnetic disk 101 as an example of arrangement of servo zones in which servo information is written. The servo zones 101a are arranged on the front surface and the back surface of the magnetic disk 101 in the same way. A plurality of bands 200 is arranged in the radial direction of the magnetic disk 101. Although four bands 200 are shown as an example in FIG. 2A, the number of bands 200 on a surface of the magnetic disk 101 may be selected as appropriate. Each band 200 includes a number of tracks, and data is continuously recorded on the sectors on the circumference of each track in a shingled magnetic recording method. FIG. 2B shows a recording method of an example band 200. As shown in FIG. 2B, in the present embodiment, recording is performed while partially overwriting data of adjacent tracks in each track Tr(N), where N=1, 2, . . . . In the following description, a data access order will be mainly described with respect to bands 200 and 201, where a band on the front surface is referred to as a band 201 and a corresponding band on the back surface is referred to as a band 202. In some embodiments, the band 201 overlaps at least a portion of the band 202, as described in detail in conjunction with FIGS. 7-10. The writing of data to the bands 200 is performed via the shingled magnetic recording method described above.

Figure 3:
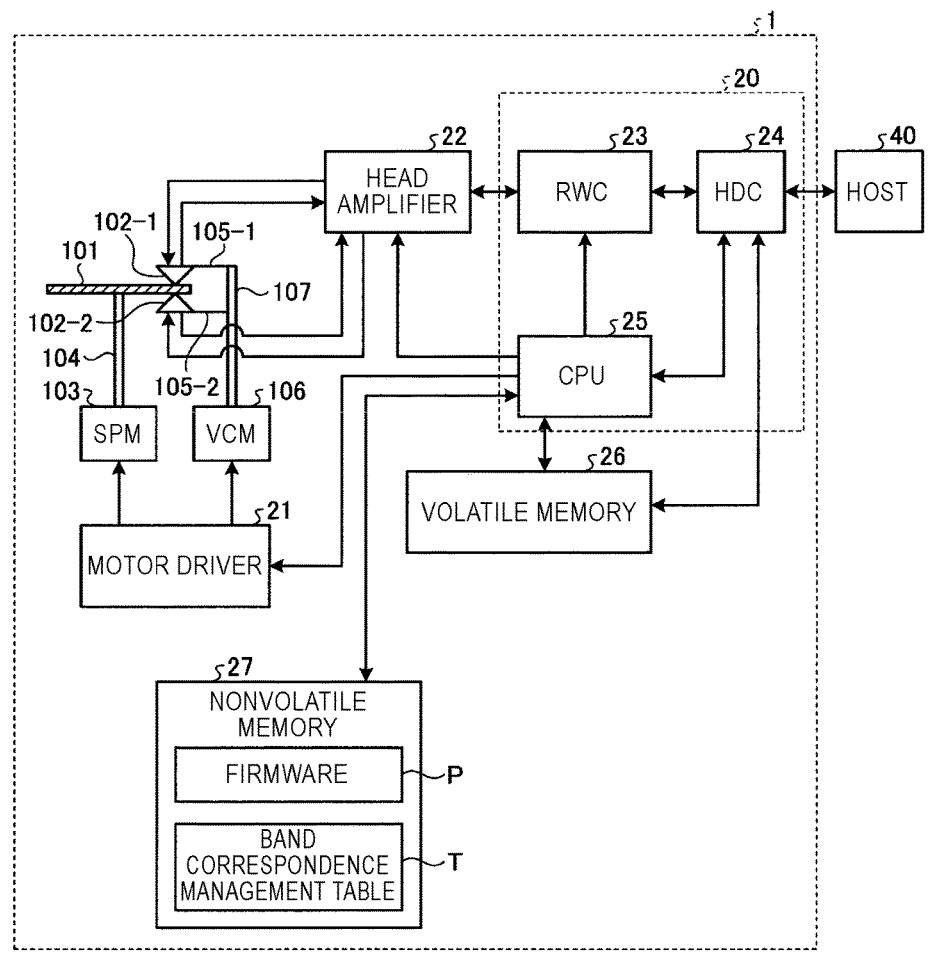
FIG. 3 is a view illustrating an example of the configuration of a control block of the hard disk device according to an embodiment.

FIG. 3 is a view illustrating an example of the configuration of a control block of the hard disk device 1. In FIG. 3, the same control elements as those shown in FIG. 1 are denoted by the same reference numerals. As shown in FIG. 3, the hard disk device 1 includes a motor driver 21, a head amplifier 22, an RWC (Read/Write Channel) 23, an HDC (Hard Disk Controller) 24, a CPU (Central Processing Unit) 25, a volatile memory 26, and a nonvolatile memory 27.

The motor driver 21 drives the SPM 103 so as to rotate the magnetic disk 101 at a predetermined rotational speed. Further, the motor driver 21 controls the VCM 106 according to a control value from the CPU 25. Under the control of the VCM 106, the arms 105-1 and 105-2 are rotated together, the magnetic head 102-1 for the front surface is positioned on a track on the front surface of the magnetic disk 101, and the magnetic head 102-2 for the back surface is positioned on a track on the back surface.

Each of the head amplifier 22 and the RWC 23 indicates two circuits (i.e., a first circuit connected to the magnetic head 102-1 for the front surface and a second circuit connected to the magnetic head 102-2 for the back surface) as one. For each circuit, the head amplifier 22 supplies a write signal (current), which corresponds to write data input from the RWC 23. Thus, the head amplifier supplies a first write signal to the circuit connected to the magnetic head 102-1 for the front surface and a second write signal to the circuit connected to the magnetic head 102-2 for the back surface. Further, the head amplifier 22 amplifies each read signal output from the magnetic head 102-1 for the front surface and the magnetic head 102-2 for the back surface via respective circuits, and supplies the amplified read signal to the corresponding circuit of the RWC 23.

The RWC 23 represents signal processing circuits of two different control circuits. For each control circuit, the RWC 23 encodes (code-modulates) write data input from the HDC 24 and outputs the encoded write data to the head amplifier 22. In addition, for each control circuit, the RWC 23 decodes (code-demodulates) read data from each read signal transmitted from the head amplifier 22 and outputs the decoded read data to the HDC 24.

The HDC 24 controls data exchange with the host 40 via an interface (I/F) bus. The HDC 24 includes a host I/F circuit (not shown).

The CPU 25 performs overall control of the hard disk device 1 according to firmware P and a band correspondence management table T stored in a nonvolatile memory 27. For example, the CPU 25 executes various control processes such as a servo control process for positioning the set of magnetic heads 102 and for a read/write control process. In the read/write control process, the CPU 25 controls the head amplifier 22, the RWC 23, and the like according to a data access order (write order or the like) to be described later. Accordingly, one of the magnetic head 102-1 for the front surface and the magnetic head 102-2 for the back surface is caused to read the read data or write the write data. Alternatively or additionally, in some embodiments both the magnetic head 102-1 for the front surface and the magnetic head 102-2 for the back surface are simultaneously caused to read the read data or write the write data.

A hardware configuration including the RWC 23, the HDC 24, and the CPU 25 may be implemented as a controller 20 by a single chip integrated circuit (such as a system on chip).

The motor driver 21, the head amplifier 22, the volatile memory 26, and the nonvolatile memory 27 are connected to the CPU 25 of the controller 20.

The nonvolatile memory 27 is configured to be rewritable by the CPU 25, and stores the firmware P, the band correspondence management table T, and the like.

The volatile memory 26 is configured with a DRAM (Dynamic RAM), an SRAM (Static RAM), or the like. The volatile memory 26 includes a command queue, a buffer, and a working area.

The command queue queues a plurality of commands received by the HDC 24 in the order of reception. Each of the plurality of commands includes a logical address for accessing the magnetic disk 101.

The buffer includes a write buffer and a read buffer. The write buffer temporarily stores data to be written in the magnetic disk 101 by a command (for example, a write command) instructing writing of write data into the magnetic disk 101. The read buffer temporarily stores data read from the magnetic disk 101 by a command (for example, a read command) instructing reading of read data from the magnetic disk 101.

Control of access to a plurality of medium surfaces in the hard disk device 1 will now be described. In some cases, due to events occurring after shipment of the hard disk device 1, the magnetic head 102-1 for the front surface and the magnetic head 102-2 for the back surface may be altered in their relative positions, in particular in the movement direction along the broken line R (see FIG. 1) of the magnetic disk 101. This positional deviation between the magnetic head 102-1 and the magnetic head 102-2 in the movement direction along the broken line R is caused by, for example, mechanical displacement of one arm 105 in the direction of the rotation axis due to an impact, thermal deformation of parts making up the actuator that includes the magnetic head 102-1 and the magnetic head 102-2, or the like. Such positional deviation between the magnetic head 102-1 and the magnetic head 102-2 is referred to as an "inter-plane relative trajectory error". As used herein, the term "inter-plane relative trajectory error" refers to an error of each magnetic head with respect to the track of the broken line R on a respective medium.

Figure 4:
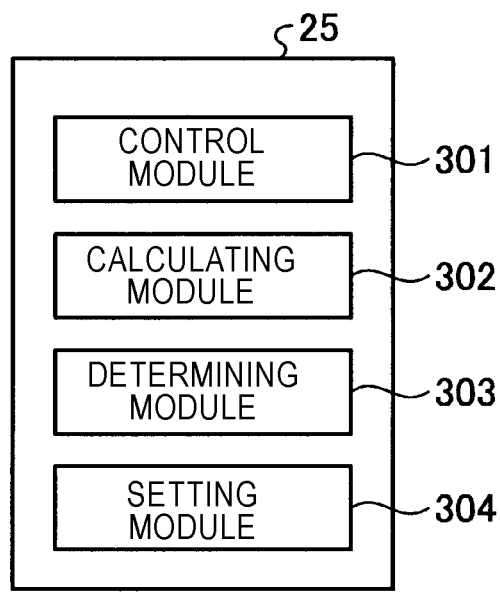
FIG. 4 is a view illustrating an example of the configuration of functional blocks of a CPU of the hard disk device according to an embodiment.

FIG. 4 is a view illustrating an example of the functional block configuration of the CPU 25 of the hard disk device 1. By reading firmware P (see FIG. 3) into the volatile memory 26 and executing the firmware P, the CPU 25 implements a control module 301, a calculating module 302, a determining module 303, and a setting module 304, as shown in FIG. 4. Here, the control module 301 and the setting module 304 correspond to the "control unit". The calculating module 302 corresponds to the "calculating unit". The determining module 303 corresponds to the "determining unit".

The control module 301 performs servo control, data access control, and the like. Specifically, the control module 301 controls the VCM 106 via the motor driver 21 to position the magnetic head 102-1 for the front surface and the magnetic head 102-2 for the back surface on arbitrary tracks, respectively. In addition, the control module 301 controls data access of recording (writing) and reading with respect to the front and back surfaces of the magnetic disk 101 based on order data to be described later.

Based on the servo information read from the magnetic head 102-1 for the front surface and from the magnetic head 102-2 for the back surface, the calculating module 302 calculates an inter-plane relative trajectory error between the magnetic head 102-1 for the front surface and the magnetic head 102-2 for the back surface.

The determining module 303 reads the band correspondence management table T (see FIG. 3) and determines order data, which is to be described later. The band correspondence management table T includes band relative position information such as a leading radius and a bandwidth (which will be described later) of each band 200 of the front and back surfaces of the magnetic disk 101.

The setting module 304 sets the order data in the band correspondence management table T, where the data that is written on each band 200 by the control module 301 is based on the order data. The control module 301 reads the order data from the band correspondence management table T and reads the data from each band 200 in the order of the order data.

A method of calculating the inter-plane relative trajectory error by the calculating module 302 will now be described. The inter-plane relative trajectory error may be calculated based on the servo information read from the magnetic head 102-1 for the front surface and the magnetic head 102-2 for the back surface, for example.

Figure 5:
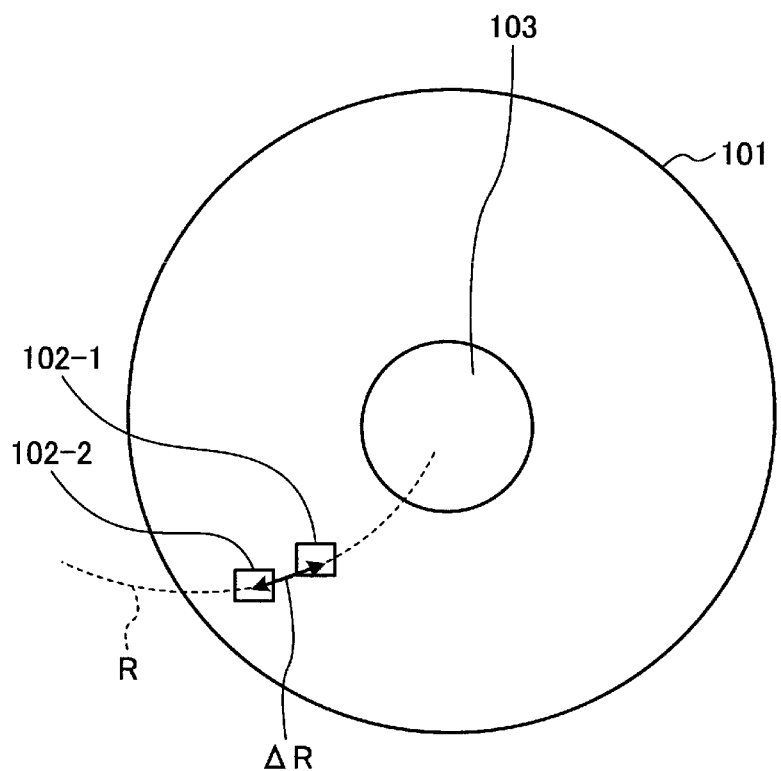
FIG. 5 is a view illustrating an example of a method of calculating inter-plane relative trajectory error according to an embodiment.

FIG. 5 is a view illustrating an example of a method of calculating the inter-plane relative trajectory error. The calculating module 302 reads the position of the magnetic head 102-1 for the front surface on the magnetic disk 101 from the servo information at the position of the magnetic head 102-1 for the front surface. The calculating module 302 also reads the position of the magnetic head 102-2 for the back surface on the magnetic disk 101 from the servo information at the position of the magnetic head 102-2 for the back surface. The calculating module 302 then calculates an inter-plane relative trajectory error $\Delta R$ along a broken line R indicated in FIG. 5, where the inter-plane relative trajectory error $\Delta R$ is a distance along the broken line R between the magnetic head 102-1 and the magnetic head 102-2. When the inter-plane relative trajectory error $\Delta R$ is sufficiently smaller than the radius of the magnetic disk 101, it may be linearly approximated.

For example, the calculating module 302 reads each track number from a gray code at the position of the magnetic head 102-1 for the front surface and a gray code at the position of the magnetic head 102-2 for the back surface, and calculates the inter-plane relative trajectory error ΔR from a pitch interval between tracks. In the following description, it is assumed that the inter-plane relative trajectory error ΔR satisfies the relationship of ΔR>0 when the magnetic head 102-1 for the front surface precedes the magnetic head 102-2 for the back surface. Conversely, the inter-plane relative trajectory error ΔR satisfies the relationship of ΔR<0 when the magnetic head 102-2 for the back surface precedes the magnetic head 102-1 for the front surface.

Order data determined by the determining module 303 will now be described.

Figures 6, 7:
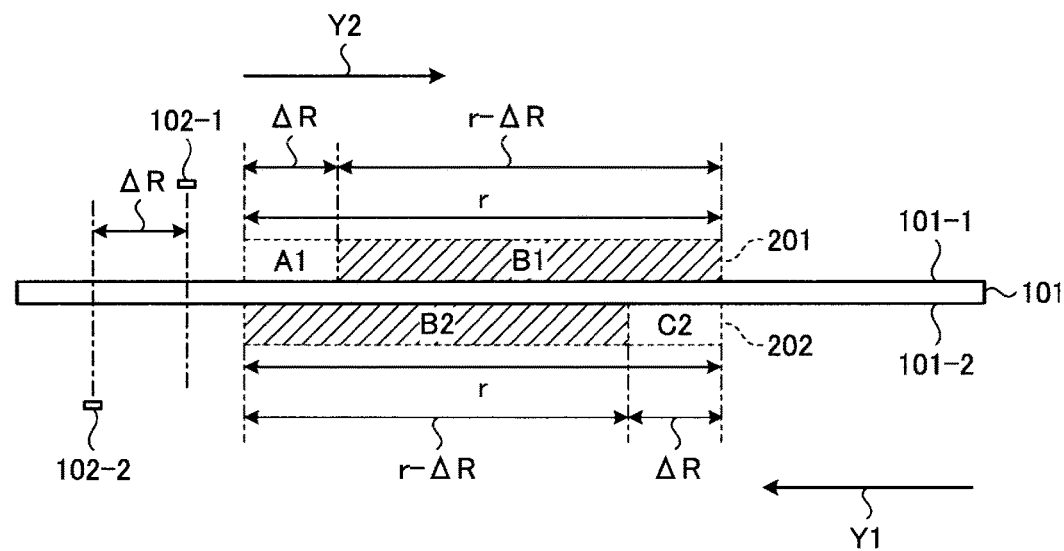
FIG. 6 is an explanatory view of order data according to an embodiment.
FIG. 7 is a view illustrating an example (Case 1) of the positional relationship between bands on the front and back surfaces of a magnetic disk according to an embodiment.

FIG. 6 is an explanatory view of order data. FIG. 6 represents parameters indicating an access order to be determined for a band 201 (see FIG. 7) of the front surface 101-1 (see FIG. 7) of the magnetic disk 101 and a band 202 (see FIG. 7) of the back surface 101-2 (see FIG. 7) of the magnetic disk 101. The access order is divided into "starting," which means accessing one surface of the magnetic disk 101 prior to accessing the other surface of the magnetic disk 101, "simultaneous," which means accessing multiple surfaces of the magnetic disk at the same time, and "subsequent," which means accessing one surface of the magnetic disk 101 after accessing the other surface of the magnetic disk 101. In FIG. 6, indicates "starting", "B" indicates "simultaneous", and "C" indicates "subsequent". In addition, the front surface is indicated by "1" and the back surface is indicated by "2". Accordingly, in FIG. 6, for example, a parameter A1 indicates "front surface/starting", a parameter B1 indicates "front surface/simultaneous", a parameter C1 indicates "front surface/subsequent", and a parameter A2 indicates "back surface/starting". In sum, when there are two medium surfaces to be simultaneously accessed, there are six possible combinations of access order for the bands 201 and 202 by corresponding recording heads.

For each of the parameters A1, B1, C1, A2, B2, and C2, the determining module 303 sets a band range obtained by a calculation to be described later.

A method of calculating the band range to be set for the parameters A1, B1, C1, A2, B2, and C2 of the order data (see FIG. 6) will now be described. In the present embodiment, Cases 1 to 4 are described with respect to the different possible positional relationships between a band on the front surface and corresponding band on the back surface of the magnetic disk 101.

FIG. 7 is a view illustrating an example (Case 1) of the positional relationship between corresponding bands 200 on the front surface and the back surface of the magnetic disk 101. FIG. 7 shows that the band 201 on the front surface 101-1 and the band 202 on the back surface 101-2 of the magnetic disk 101 have the same leading radius and the same bandwidth. As used herein, the term "leading radius" refers to the radius (radial position) of the outermost track of a plurality of tracks in a band. The term "bandwidth" refers to the radial width from the outermost track (leading track in the movement direction when shingled magnetic recording is employed) to the innermost track (last/trailing track in the movement direction when shingled magnetic recording is employed) in a band.

FIG. 7 also shows the positional relationship between the magnetic head 102-1 for the front surface and the magnetic head 102-1 for the back surface, where the inter-plane relative trajectory error ΔR is defined between the position of the magnetic head 102-1 with respect to the front surface 101-1 of the magnetic disk 101 and the position of the magnetic head 102-2 with respect to the back surface 101-2 of the magnetic disk 101. In FIG. 7, the direction indicated by an arrow Y1 represents the direction from the rotation center side (inner diameter) of the magnetic disk 101 to the outer peripheral side (outer diameter (of the magnetic disk 101 along the broken line R (see FIG. 1). The direction indicated by an arrow Y2 indicates the shingled magnetic recording (SMR) write direction, i.e., the movement direction of the magnetic head 102-1 for the front surface and the magnetic head 102-2 when the magnetic head 102-1 and the magnetic head 102-2 write data via shingled magnetic recording on the front surface 101-1 and the back surface 101-2 of the magnetic disk 101, respectively.

In the current example illustrated in FIG. 7, the front surface magnetic head 102-1 precedes the back surface magnetic head 102-2 by the inter-plane relative trajectory error ΔR in the movement direction when writing data. That is, the magnetic head 102-2 follows the magnetic head 102-1 by a distance equal to the inter-plane relative trajectory error ΔR in the direction indicated by the arrow Y2. In this case, ΔR>0. It is noted that in some situations, the back surface magnetic head 102-2 precedes the front surface magnetic head 102-1 by the inter-plane relative trajectory error ΔR in the movement direction when writing data, in which case, ΔR<0.

In Case 1, the magnetic head 102-1 precedes the magnetic head 102-2 and enters the band 201 and, at the point in time at which the magnetic head 102-1 reaches a distance in the band 201 equal to the inter-plane relative trajectory error ΔR, the magnetic head 102-2 enters the band 202. Then, the magnetic head 102-1 and the magnetic head 102-2 simultaneously pass through the band 201 and the band 202, respectively, and, after the magnetic head 102-1 has exited the band 201 and moves beyond the band 201 by the distance of the inter-plane relative trajectory error ΔR, the magnetic head 102-2 exits the band 202.

Therefore, in FIG. 7, when the bandwidth of each of the band 201 of the front surface 101-1 and the band 202 of the back surface 101-2 is r, as can be seen from FIG. 7, the distance by which the front surface magnetic head 102-1 is able to advance in the band 201 earlier than the back surface magnetic head 102-2 is ΔR. In addition, the distance in the SMR write direction (Y2) by which the front surface magnetic head 102-1 and the back surface magnetic head 102-2 are able to simultaneously access the front surface 101-1 and the back surface 101-2 is r-ΔR. In addition, the distance in the SMR write direction (Y2) from the point at which the magnetic head 102-1 exits the band 201 to the point at which the magnetic head 102-2 exits the band 202 is ΔR.

Therefore, in Case 1, the band ranges of the parameters A1, B1, C1, A2, B2, and C2 correspond to ΔR, r−ΔR, none, none, r-ΔR, and ΔR, respectively. That is, the parameter A1 corresponds to tracks disposed in the range from the leading radius of the band 201 to a distance ΔR in the SMR write direction, the parameter B1 corresponds to tracks disposed in the range from the end of the range of the parameter A1 to a further distance r-ΔR in the SMR write direction, the parameters C1 and A2 have no corresponding tracks (and are not used in Case 1), the parameter B2 corresponds to tracks disposed in the range from the leading radius of the band 202 to a further distance r-ΔR in the SMR write direction, and the parameter C2 corresponds to tracks disposed in the range from the end of the range of the parameter B2 to ΔR in the SMR write direction.

According to this setting, the CPU 25 causes data targeted to be written in the band range "A1" of the band 201 to be written by the front surface magnetic head 102-1 alone, subsequently causes data targeted to be written in the band range "B1" of the band 201 and the band range "B2" of the band 202 to be respectively written by the front surface magnetic head 102-1 and the back surface magnetic head 102-2 at the same time, and then causes data targeted to be written in the remaining band range "C2" of the band 202 to be written by the back surface magnetic head 102-2 alone. Thus, the CPU 25 causes data to be written to the band 201 and the band 202 based on band relative position information for the first band and the second band and on the inter-plane relative trajectory error between the first recording head and the second recording head.

In this embodiment, a set of two corresponding bands are shown on the front surface 101-1 and the back surface 101-2 for the purpose of explanation. When a magnetic head corresponding to front surface 101-1 passes through a band on the front surface 101-1 while a magnetic head corresponding to the back surface 101-2 passes through a band on the back surface, the band on the front surface 101-1 and the band on the back surface 101-2 correspond to each other. These are the bands through which the respective magnetic heads simultaneously pass by scanning of the scanning mechanism.

Figure 8:
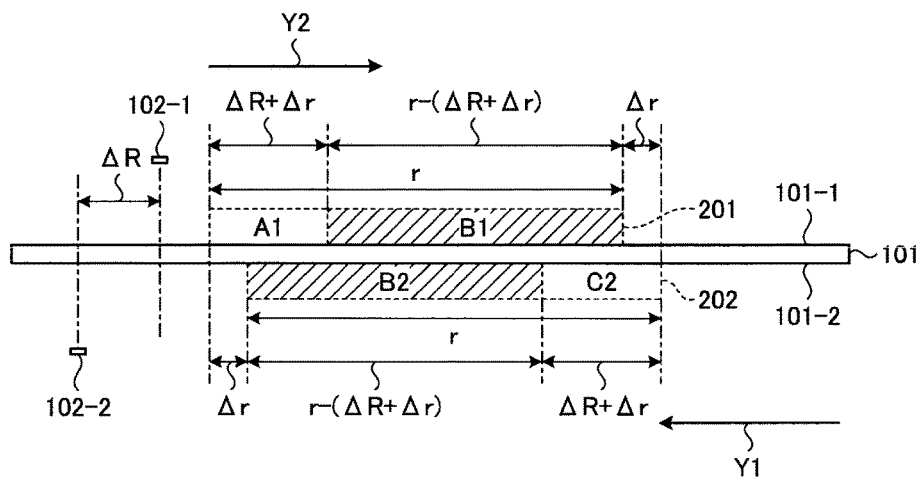
FIG. 8 is a view illustrating another example (Case 2) of the positional relationship between bands on the front and back surfaces of a magnetic disk according to an embodiment.

FIG. 8 is a view illustrating another example (Case 2) of the positional relationship between bands on the front surface 101-1 and the back surface 101-2 of the magnetic disk 101. FIG. 8 shows that the band 201 on the front surface 101-1 and the band 202 on the back surface 101-2 of the magnetic disk 101 have an offset of the leading radius, but still have the same bandwidth.

In FIG. 8, the offset of the leading radius is Δr. In this example, Δr is positive in the direction opposite to the shingled magnetic recording direction on the magnetic disk 101, i.e., the leading radius of band 201 is disposed more in the direction opposite to Y2 than the leading radius of band 202. Then, in Case 2, the parameters A1, B1, C1, A2, B2, and C2 correspond to: tracks disposed in the range from the leading track of the band 201 to a distance ΔR+Δr in the SMR write direction, tracks disposed in the range from the end of the range of parameter A1 to a distance r−(ΔR+Δr) in the SMR write direction; none, none, tracks disposed in the range from the leading track of the band 202 to a distance r−(ΔR+Δr) in the SMR write direction; and tracks disposed in the range from the end of the range of parameter B2 to a distance ΔR+Δr in the SMR write direction, respectively.

According to this setting, the CPU 25 causes data targeted to be written in the band range "A1" of the band 201 to be written by the front surface magnetic head 102-1 alone, subsequently causes data targeted to be written in the band range "B1" of the band 201 head 102-1 and the band range "B2" of the band 202 to be respectively written by the front surface magnetic 102-1 and the back surface magnetic head 102-2 at the same time, and then causes data targeted to be written in the remaining band range "C2" of the band 202 to be written by the back surface magnetic head 102-2 alone.

Figure 9:
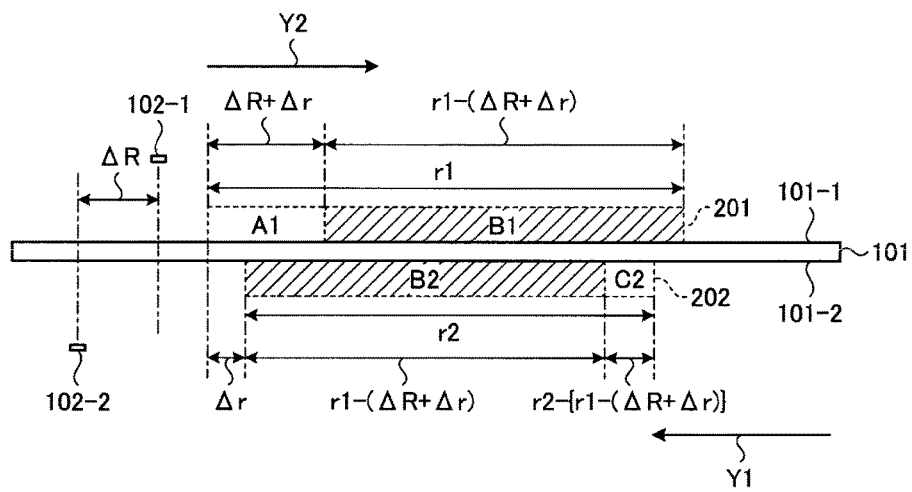
FIG. 9 is a view illustrating another example (Case 3) of the positional relationship between bands on the front and back surfaces of a magnetic disk according to an embodiment.

FIG. 9 is a view illustrating another example (Case 3) of the positional relationship between bands on the front surface 101-1 and the back surface 101-2 of the magnetic disk 101. FIG. 9 shows that the band 201 on the front surface 101-1 and the band 202 on the back surface 101-2 of the magnetic disk 101 have an offset of the leading radius and also have different bandwidths.

In FIG. 9, the offset of the leading radius is Δr and the bandwidths of the band 201 and the band 202 are r1 and r2, respectively. Then, in Case 3, the parameters A1, B1, C1, A2, B2, and C2 are based on the values ΔR+Δr, r1−(ΔR+Δr), none, none, r1−(ΔR+Δr), and r2−{r1−(ΔR+Δr)}, respectively, in a similar way in which these parameters are defined above for Cases 1 and 2.

According to this setting, the CPU 25 causes data targeted to be written in the band range "A1" of the band 201 to be written by the front surface magnetic head 102-1 alone, subsequently causes data targeted to be written in the band range "B1" of the band 201 and the band range "B2" of the band 202 to be respectively written by the front surface magnetic head 102-1 and the back surface magnetic head 102-2 at the same time, and then causes data targeted to be written in the remaining band range "C2" of the band 202 to be written by the back surface magnetic head 102-2 alone.

Figure 10:
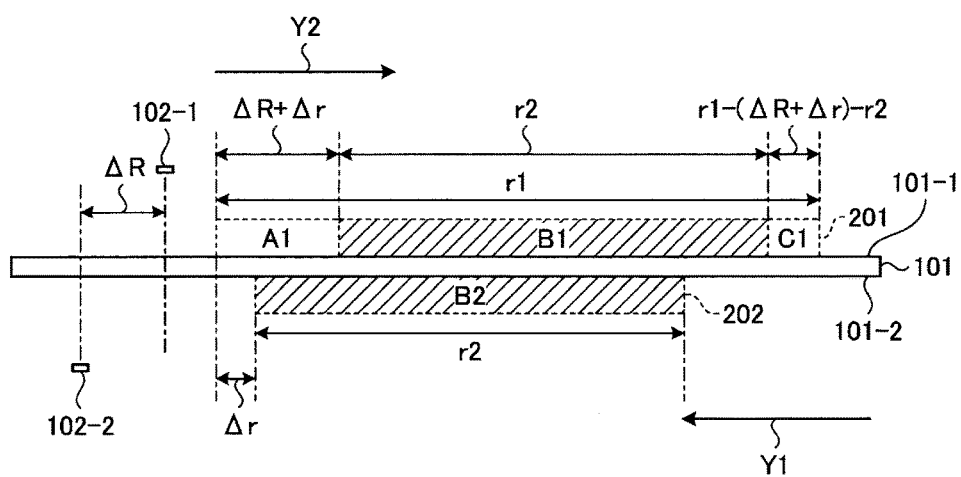
FIG. 10 is a view illustrating another example (Case 4) of the positional relationship between bands on the front and back surfaces of a magnetic disk according to an embodiment.

FIG. 10 is a view illustrating another example (Case 4) of the positional relationship between bands on the front surface 101-1 and the back surface 101-2 of the magnetic disk 101. Similar to FIG. 9, FIG. 10 shows another example in which the band 201 on the front surface 101-1 and the band 202 on the back surface 101-2 of the magnetic disk 101 have an offset of the leading radius and also have different bandwidths. Case 4 is a case where the band 201 on the front surface 101-1 has a longer bandwidth than the band 202 on the back surface 101-2, and writing is performed by the front surface magnetic head 102-1 after the back surface magnetic head 102-2 has exited the band 202 on the back surface 101-2.

In Case 4, the parameters A1, B1, C1, A2, B2, and C2 correspond to ΔR+Δr, r2, r1−(ΔR+Δr)−r2, none, r2, and none, respectively, in a similar way in which these parameters are defined above for Cases 1 and 2.

According to this setting, the CPU 25 causes data targeted to be written in the band range "A1" of the band 201 to be written by the front surface magnetic head 102-1 alone, subsequently causes data targeted to be written in the band range "B1" of the band 201 and the band range "B2" of the band 202 to be respectively written by the front surface magnetic head 102-1 and the back surface magnetic head 102-2 at the same time, and then causes data targeted to be written in the remaining band range "C1" of the band 201 to be written by the front surface magnetic head 102-1 alone.

Although Cases 1 to 4 have been exemplified here, other cases may be included as appropriate. The CPU 25 obtains the band ranges of the parameters A1, B1, C1, A2, B2, and C2 as described above, and performs control of writing in the bands of the front surface 101-1 and the back surface 101-2 of the magnetic disk 101 based on the obtained band ranges. During reading operations, the CPU 25 causes read data to be read from the bands of the front surface 101-1 and the back surface 101-2 of the magnetic disk 101 based on parameter values set during a preceding write process.

An access control operation with respect to the bands of the front surface 101-1 and the back surface 101-2 of the magnetic disk 101 in the hard disk device 1 will now be described.

Figure 11:
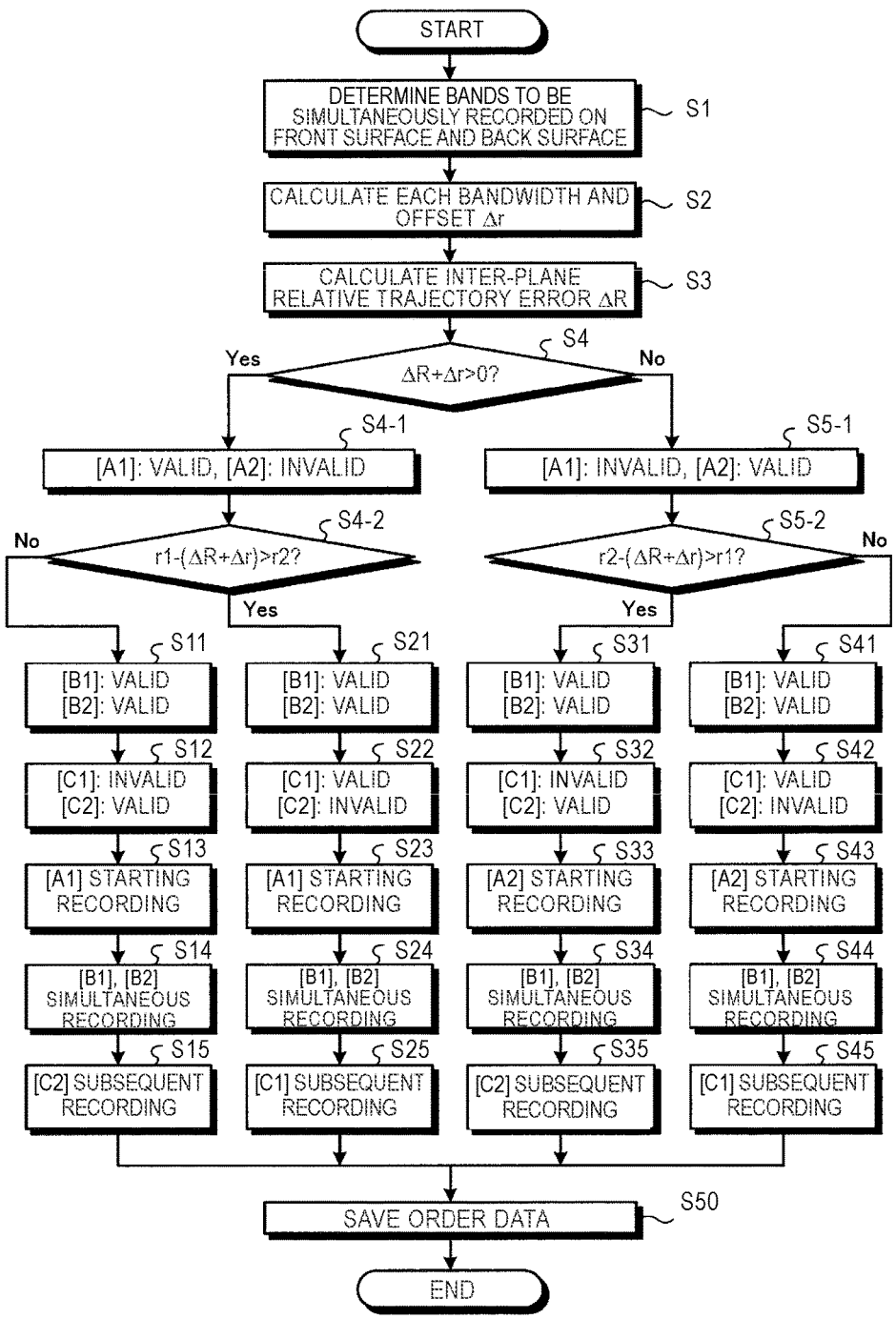
FIG. 11 is a view illustrating an example of a control flow of a CPU in a hard disk device according to an embodiment.

FIG. 11 is a view illustrating an example of a control flow of the CPU 25 in the hard disk device 1. As shown in FIG. 11, first, the CPU 25 determines a band 201 and a band 202 to be simultaneously written to. These two bands correspond to a writing target address referenced in the band correspondence management table T (see FIG. 3) (S1).

The CPU 25 then calculates the bandwidth r1 of the band 201, the bandwidth r2 of the band 202, and the offset Δr of the leading radius of each of the band 201 and the band 202 from the band relative position information included in the band correspondence management table T (S2).

The CPU 25 then calculates the inter-plane relative trajectory error ΔR between a magnetic head corresponding to the medium surface to which the band 201 belongs, that is, the magnetic head corresponding to the front surface 101-1 of the magnetic disk 101 in this embodiment (the front surface magnetic head 102-1), and a magnetic head corresponding to the medium surface to which the band 202 belongs, that is, the magnetic head corresponding to the back surface 101-2 of the magnetic disk 101 in this embodiment (the back surface magnetic head 102-2) (S3).

When $\Delta R>0$, the front surface magnetic head 102-1 precedes the back surface magnetic head 102-2 by the inter-plane relative trajectory error $\Delta R$ in the direction of shingled magnetic recording. When $\Delta R<0$, the back surface magnetic head 102-2 precedes the front surface magnetic head 102-1 by the inter-plane relative trajectory error $\Delta R$ in the direction of shingled magnetic recording. In addition, when $\Delta r>0$, the head of the band 201 is shifted in the shingled magnetic recording direction in comparison with the band 202. When $\Delta r<0$, the head of the band 202 is shifted in the shingled magnetic recording direction in comparison with the band 201.

In light of the above, it is possible to determine which band is to be written to first, that is, which band is to be selected as a starting writing area, based on whether the sum ($\Delta R+\Delta r$) of the inter-plane relative trajectory error $\Delta R$ and the offset $\Delta r$ is positive or negative. Consequently, the following determining process can be performed.

First, the CPU 25 determines whether or not $\Delta R+\Delta r$ is positive (S4). When $\Delta R+\Delta r$ is positive (Yes in S4), the CPU 25 makes the starting writing area "A1" of the band 201 valid and makes the starting writing area "A2" of the band 202 invalid (S4-1). For each "valid" band range, the band range of a corresponding parameter is calculated and the calculation result is set. For each "invalid" band range, the band range of a corresponding parameter is set to "0".

When $\Delta R+\Delta r$ is negative (No in S4), the starting writing area "A1" of the band 201 is made invalid and the starting writing area "A2" of the band 202 is made valid (S5-1). Although not shown, when $\Delta R+\Delta r=0$ (No in S4), both the starting writing area "A1" of the band 201 and the starting writing area "A2" of the band 202 are made invalid and then, subsequent to step S5-1, a process to be described later is performed.

Hereinafter, a description is set forth of a scenario in which writing to the band 201 is initiated prior to writing to the band 202 (a process subsequent to S4-1). First, the CPU 25 determines whether the subsequent writing area "C1" of the band 201 is valid or the subsequent writing area "C2" of the band 202 is valid (S4-2).

Specifically, when the width excluding the starting writing area "A1" of the band 201, that is, r1–($\Delta R+\Delta r$), exceeds the width r2 of the band 202, an area to be written in the rear portion of the band 201 remains when the simultaneous writing of the band 201 and the band 202 is completed. Therefore, the CPU 25 determines whether the subsequent writing area "C1" of the band 201 is valid or the subsequent writing area "C2" of the band 202 is valid, based on the determination on r1–($\Delta R+\Delta r$)>r2.

When r1–($\Delta R+\Delta r$)<r2 (No in S4-2), the CPU 25 makes the simultaneous writing area "B1" of the band 201 and the simultaneous writing area "B2" of the band 202 valid (S11), makes the subsequent writing area "C1" of the band 201 invalid, and makes the subsequent writing area "C2" of the band 202 valid (S12). Although not shown, when r1–($\Delta R+\Delta r$)=r2 (No in S4-2), the subsequent writing area "C1" of the band 201 and the subsequent writing area "C2" of the band 202 are both made invalid and a process subsequent to step S12 is performed.

The CPU 25 then performs writing in the order of the determined order data. That is, when r1–($\Delta R+\Delta r$)<r2 (No in S4-2), writing is performed in the starting writing area "A1" (S13), simultaneous writing is performed in the simultaneous writing areas "B1" and "B2" (S14), and writing is subsequently performed in the subsequent writing area "C2" (S15). When r1–($\Delta R+\Delta r$)=r2 (No in S4-2), writing is performed in the starting writing area "A1" (S13), simultaneous writing is performed in the simultaneous writing areas "B1" and "B2" (S14), and the process of step S15 is skipped.

On the other hand, when r1–($\Delta R+\Delta r$)>r2 (Yes in S4-2), the CPU 25 makes the simultaneous writing area "B1" of the band 201 and the simultaneous writing area "B2" of the band 202 valid (S21), and makes the subsequent writing area "C1" of the band 201 valid and the subsequent writing area "C2" of the band 202 invalid (S22).

The CPU 25 then performs writing in the order of the determined order data. That is, in this case, writing is performed in the starting writing area "A1" (S23), simultaneous writing is performed in the simultaneous writing areas "B1" and "B2" (S24), and writing is then lastly performed in the subsequent writing area "C1" (S25).

Hereinafter, a description is set forth of a scenario in which writing to the band 202 is initiated prior to writing to the band 201 (a process subsequent to S5-1). First, the CPU 25 determines whether the subsequent writing area "C1" of the band 201 is valid or the subsequent writing area "C2" of the band 202 is valid (S5-2).

Specifically, when the width excluding the starting recording area "A2" of the band 202 exceeds the width r1 of the band 201, an area to be written in the rear portion of the band 202 remains when the simultaneous writing of the band 201 and the band 202 is completed. Therefore, the CPU 25 determines whether the subsequent writing area "C1" of the band 201 is valid or the subsequent writing area "C2" of the band 202 is valid, based on the determination on r2–($\Delta R+\Delta r$)>r1.

When r2–($\Delta R+\Delta r$)>r1 (Yes in S5-2), the CPU 25 makes the simultaneous writing area "B1" of the band 201 and the simultaneous writing area "B2" of the band 202 valid (S31), and makes the subsequent writing area "C1" of the band 201 invalid and the subsequent writing area "C2" of the band 202 valid (S32).

The CPU 25 then performs writing in the order of the determined order data. That is, when $\Delta R+\Delta r<0$ (No in S4) and r2–($\Delta R+\Delta r$)>r1 (Yes in S5-2), writing is performed in advance of the starting writing area "A2" (S33), simultaneous writing is performed in the simultaneous writing areas "B1" and "B2" (S34), and writing is subsequently performed in the subsequent writing area "C2" (S35).

When $\Delta R+\Delta r=0$ (No in S4) and r2–($\Delta R+\Delta r$)>r1 (Yes in S5-2), the process of step S33 is skipped, simultaneous writing is performed in the simultaneous writing areas "B1" and "B2" (S34), and then writing is performed subsequently in the subsequent writing area "C2" (S35).

On the other hand, when r2–($\Delta R+\Delta r$)<r1 (No in S5-2), the CPU 25 makes the simultaneous writing area "B1" of the band 201 and the simultaneous writing area "B2" of the band 202 valid (S41), and makes the subsequent writing area "C1" of the band 201 valid and the subsequent writing area "C2" of the band 202 invalid (S42). Although not shown, when r2–($\Delta R+\Delta r$)=r1 (No in S5-2), the subsequent writing area "C1" of the band 201 and the subsequent writing area "C2" of the band 202 are made invalid together.

The CPU 25 then performs writing in the order of the determined order data. That is, when $\Delta R+\Delta r<0$ (No in S4) and r2–($\Delta R+\Delta r$)<r1 (No in S5-2), writing is first performed in the starting writing area "A2" (S43), simultaneous writing is performed in the simultaneous writing areas "B1" and "B2" (S44), and writing is performed subsequently in the subsequent writing area "C1" (S45).

When $\Delta R+\Delta r=0$ (No in S4) and $r2-(\Delta R+\Delta r)<r1$ (No in S5-2), the process of the step S43 is skipped, simultaneous writing is performed in the simultaneous writing areas "B1" and "B2" (S44), and then writing is subsequently performed in the subsequent writing area "C1" (S45).

When $\Delta R+\Delta r=0$ (No in S4) and $r2-(\Delta R+\Delta r)=r1$ (No in S5-2), the process of the step S43 is skipped, simultaneous writing is performed in the simultaneous writing areas "B1" and "B2" (S44), and the process of the step S45 is skipped.

When $\Delta R+\Delta r<0$ (No in S4) and $r2-(\Delta R+\Delta r)=r1$ (No in S5-2), writing is first performed in the starting writing area "A2" (S43), simultaneous writing is performed in the simultaneous writing areas "B1" and "B2" (S44), and the process of step S45 is skipped.

After completion of the steps S15, S25, S35, or S45, the CPU 25 saves the order data in the band correspondence management table T (S50) and terminates the access control operation.

In data reading, the CPU 25 performs simultaneous reading from the plurality of recording surfaces based on the order data stored in the band correspondence management table T in step S50.

As described above, the hard disk device of the present embodiment calculates an inter-plane relative trajectory error between pairs of recording heads, and determines a data access order for corresponding band on a first medium surface and a second medium surface. The first medium surface corresponds to a first recording head of a pair of recording heads and the second medium surface corresponds to a second recording head of the pair of recording heads. The data access order is determined for a first band on the first medium surface and a second band on the second medium surface, where, by scanning of the scanning mechanism of the hard disk device, the first recording head passes through the first band while the second recording head simultaneously passes through the second band. The data access order for the first band and the second band by the first recording head and the second recording head is determined based on band relative position information for the first band and the second band and on the inter-plane relative trajectory error between the first recording head and the second recording head. Then, data access in the first band and the second band by the first recording head and the second recording head is performed in the determined data access order. Therefore, even when an inter-plane relative trajectory error occurs, this inter-plane relative trajectory error is compensated for by the data access order of each medium surface.

In other words, it is possible compensate for inter-plane relative trajectory error between pairs of recording heads without adding any mechanical parts, thereby avoiding complexity of mechanical design.

In this embodiment, the band relative position information is read from the band correspondence management table T. Alternatively, the band relative position information may be recorded and fixed in advance before shipment, or may be dynamically generated by a user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A hard disk device comprising:
    a scanning mechanism that simultaneously scans a first recording medium surface with a first recording head and a second recording medium surface with a second recording head;
    a table that stores band relative position information for a first band on the first recording medium surface and a second band on the second recording medium surface; and
    a processor configured to calculate an inter-plane relative trajectory error between the first recording head and the second recording head, determine a data access order performed by the first recording head on the first band and the second recording head on the second band, based on the band relative position information and the inter-plane relative trajectory error, and cause the first recording head to access a track in the first band and the second recording head to access a track in the second band according to the data access order.

2. The hard disk device according to claim 1, wherein the data access order indicates a first range of tracks in the first band and a second range of tracks in the second band, and wherein the first range of tracks is accessed by the first recording head while the second recording head simultaneously accesses the second range of tracks.

3. The hard disk device according to claim 2, wherein accessing a band comprises one of reading data from a track included in the band or writing to the track included in the band.

4. The hard disk device according to claim 2, wherein the data access order further indicates a third range of tracks that are accessed by the first recording head while the second recording head does not access any tracks in the second band.

5. The hard disk device according to claim 4, wherein the third range of tracks in the first band includes a track disposed on a leading radius in a shingled magnetic writing direction of the first band and the second range of tracks in the second band includes a track disposed on a leading radius in the shingled magnetic writing direction of the second band.

6. The hard disk device according to claim 5, wherein the leading radius of the second band is located farther in the shingled magnetic writing direction than the leading radius of the first band.

7. The hard disk device according to claim 6, wherein, according to the data access order, the first recording head accesses the third range of tracks immediately prior to accessing the first range of tracks.

8. The hard disk device according to claim 2, wherein the data access order further indicates a fourth range of tracks that are accessed by the first recording head while the second recording head does not access any tracks in the first band.

9. The hard disk device according to claim 8, wherein the data access order further indicates that the fourth range of tracks are accessed by the first recording head immediately after the first recording head accesses the first band.

10. The hard disk device according to claim 2, wherein the data access order further indicates a fourth range of tracks that are accessed by the second recording head while the first recording head does not access any tracks in the first band.

11. The hard disk device according to claim 10, wherein the data access order further indicates that the fourth range of tracks are accessed by the second recording head immediately after the second recording head accesses the second band.

12. The hard disk device according to claim 1, wherein the processor is configured to calculate the inter-plane relative trajectory error from servo information read by the first recording head from the first recording medium surface and from servo information read by the second recording head from the second recording medium surface.

13. The hard disk device according to claim 1, wherein the processor is configure to cause data to be written to the first band and the second band via a shingled magnetic recording method.

14. The hard disk device according to claim 1, wherein the inter-plane relative trajectory error is determined with respect to an arcuate path followed by the first recording head over the first recording medium surface when the scanning mechanism rotates.

15. The hard disk device according to claim 1, wherein the first recording medium surface is disposed on a first side of a magnetic disk and the second recording medium surface is disposed on a second side of the magnetic disk that is an opposite side from the first side.

16. A method of controlling a hard disk device that includes a scanning mechanism that simultaneously scans a first recording medium surface with a first recording head and a second recording medium surface with a second recording head, the method comprising:

reading band relative position information for a first band on the first recording medium surface and a second band on the second recording medium surface;

calculating an inter-plane relative trajectory error between the first recording head and the second recording head;

determining a data access order to be performed by the first recording head on the first band and the second recording head on the second band, based on the band relative position information and the inter-plane relative trajectory error; and causing the first recording head to access a track in the first band and the second recording head to access a track in the second band in the data access order.

17. The method according to claim 16, wherein the data access order indicates a first range of tracks in the first band and a second range of tracks in the second band, and wherein the first range of tracks is accessed by the first recording head while the second recording head simultaneously accesses the second range of tracks.

18. The method according to claim 17, wherein causing the first recording head to access the track in the first band comprises one of causing the first recording head to read data from a track included in the first band or writing to the track included in the first band.

19. The method according to claim 17, wherein the data access order further indicates a third range of tracks that are accessed by the first recording head while the second recording head does not access any tracks in the second band.

20. The method according to claim 19, wherein the third range of tracks in the first band includes a track disposed on a leading radius in a shingled magnetic writing direction of the first band and the second range of tracks in the second band includes a track disposed on a leading radius in the shingled magnetic writing direction of the second band.

* * * * *